I. BROWN.
DENTAL ROOT OR TOOTH DRESSER.
APPLICATION FILED DEC. 21, 1921.

1,438,168. Patented Dec. 12, 1922.

Inventor
Isaac Brown
By Attorney
James C. Ledbetter

Patented Dec. 12, 1922.

1,438,168

UNITED STATES PATENT OFFICE.

ISAAC BROWN, OF NEW YORK, N. Y.

DENTAL ROOT OR TOOTH DRESSER.

Application filed December 21, 1921. Serial No. 523,993.

*To all whom it may concern:*

Be it known that I, ISAAC BROWN, a citizen of the United States, residing at 644 Riverside Drive, borough of Manhattan, city of New York, in the county of New York and State of New York, have invented certain new and useful Improvements in Dental Root or Tooth Dressers, of which the following is a specification.

This invention relates to tooth cutting and shaping tools, and more particularly relates to dental root or tooth dressers.

An object of my invention is to produce improvements in root or tooth dressers for trimming down and forming a shoulder on a tooth for the reception of a metal cast or porcelain crown.

In the reconstruction of teeth, it is often desirable to fit either a gold or porcelain crown on a tooth for the purpose of restoring the occlusal surface thereof and for restoring the original contour of the tooth body.

In preparing a tooth for the reception of a crown the Call root dresser shown in Patent 335,890 has been used to some extent. But however this tool does not have facilities for rapidly forming a shoulder on a tooth for the reception of a crown, because in the Call tool abrasive material is used for the cutting process, there being no teeth to cut a shoulder, and there is no means for throwing off the cut tooth material.

Primarily it is an object of my invention to produce an improved tooth dresser which overcomes the disadvantages of tools now in use and which tooth dresser will fill a want felt for a tooth milling or dressing tool which quickly performs the cutting operation so that the work in a patient's mouth is not unduly prolonged.

A root dresser constructed in accordance with the plans of my invention embodies a shaft adapted to be held by a driving chuck and a shank or spider is integrally formed with the shaft, there being a toothed milling ring integrally formed on the outer ends of the spider or shank.

The accompanying drawings show an embodiment of my invention, and though there is illustrated a preferred form of construction, I claim the right of protection as to all such changes as may properly come within the scope of my invention.

Figure 1:
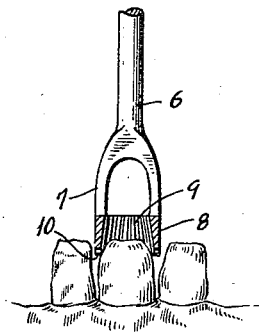
Figure 2:
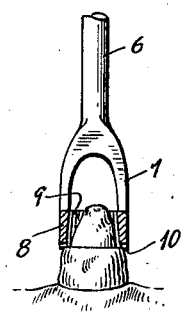
Figure 3:
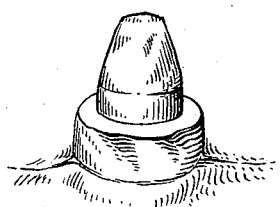
Figure 4:
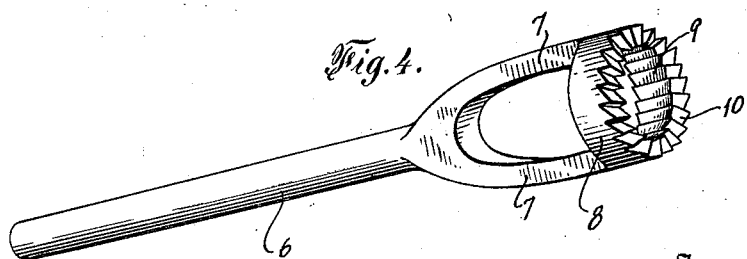

In the drawings, Figure 1 shows a tooth before being cut down by the tooth dresser; and Figure 2 shows the tooth dresser in cutting position on a tooth which is approaching completion. Figure 3 shows a tooth completely prepared with a shoulder made thereon to receive a crown. Figure 4 shows the tooth dresser in perspective.

Referring now more in particular to the drawings for a detailed description of the invention, there is shown a root dresser or tooth milling tool comprising a shaft 6 with outspread shanks or a spider 7 on the end of which is made a hollow milling or cutting ring 8. Cutting teeth 9 are formed on the interior of the hollow milling ring 8; and likewise end shoulder cutting teeth 10 are made on the edge of the tool. The combination interior and end teeth 9 and 10 produces a hollow tooth milling device which is very effective in the operation of removing tooth material. The shaft 6 is adapted to be secured in the chuck or hand-piece of a dental engine and rotated at high speed as will be understood by those conversant with the art.

An important feature of the construction of this tooth dresser resides in the outspread arrangement of the shanks 7 whereby the tooth material is thrown outwardly from the tool as fast as the material is removed from the tooth. This feature causes the interior teeth 9 to rapidly shed and become free of the tooth material. Furthermore, the milling ring 8 is somewhat greater in diameter than it is in length, which allows the dentist operating the tool to oscillate the tool over the tooth being cut, to the end that the tooth may be rounded off, or even made cone shaped during the cutting operation. The large hollow space existing between the shank 7 permits the tooth dresser to be oscillated or moved about the tooth angularly to the axis thereof so that the dentist may rapidly remove that portion of the tooth desired, leaving other portions as desired.

By referring to the drawings, it will be understood by those conversant with the art how the patient's tooth is prepared and made ready for the reception of a crown. Prior to using the cutting tool, it is preferable to remove the tooth enamel with a stone separating disc or grinder which relieves the tool of having to cut through the hard enamel surface.

A decayed tooth, or a fractured or broken tooth, may be quickly prepared for the reception of a crown because with this tool, the cutting operation is not greatly prolonged, and the undesirable parts of the tooth are rapidly cut away by skillful manipulation of this tooth milling tool.

Having described the construction and use of this dental root and tooth dresser, what I desire to claim is:

1. A dental root or tooth dresser comprising a shaft, a hollow milling ring carried on one end of the shaft, and cutting teeth made in the hollow mill and on the outer cutting edge of the mill.

2. A dental root or tooth dresser comprising a shaft, a spider made on the shaft consisting of separate shank pieces, and a hollow milling ring carried on the outer end of the spider whereby the hollow mill is adapted to rotate upon and against a tooth to remove the tooth body and produce a shoulder on the tooth for the reception of a crown.

3. A dental root or tooth dresser comprising a shaft adapted to be held in the chuck of a dental engine and rotated at high speed, outspread shank pieces integrally made on one end of the shaft, a toothed milling ring carried on the end of the shank pieces, and said milling ring being reater in diameter than in axial length of the toothed milling ring so that the milling tool may be oscillated over the tooth angularly to the axis of the tooth to cut away the desired tooth material to produce a shoulder and rounded end on the root or tooth.

In testimony whereof I have hereunto set my hand and seal this 15th day of December, 1921, in the city of New York, county of New York, borough of Manhattan, and State of New York.

ISAAC BROWN. [L. S.]